United States Patent Office 3,409,569
Patented Nov. 5, 1968

3,409,569
BUTADIENE-STYRENE-ALPHA-BETA UNSATURATED ACID-ACRYLIC NITRILE PAPER COATING COMPOSITION
Robert E. Lane, Westbrook, Maine, and John E. Carmichael, Cuyahoga Falls, Ohio, assignors to The General Tire & Rubber Company, Akron, Ohio, a corporation of Ohio
No Drawing. Continuation-in-part of application Ser. No. 551,468, May 19, 1966. This application Apr. 5, 1967, Ser. No. 628,527
8 Claims. (Cl. 260—8)

ABSTRACT OF THE DISCLOSURE

An improved butadiene-styrene latex type of paper coating composition consists of the basic butadiene and styrene monomer modified by specific proportions of methacrylic acid and acrylonitrile. Coatings made with this polymer have several improved properties, notably better water retention, greater stiffness and higher gloss, as compared to conventional coatings.

RELATED APPLICATIONS

This application is a continuation-in-part of Serial No. 551,468, filed May 19, 1966, and abandoned, which was in turn a continuation of Ser. No. 263,118, filed March 6, 1963, and also abandoned.

BACKGROUND OF THE INVENTION

Aqueous dispersions or latices of various types of synthetic polymeric adhesives are used in paper coating compositions as a binder for the mineral pigments in the coating. Specific and often unexpected improvements in the performance of the coating compositions can be obtained by varying the basic type of polymer or copolymer used and by controlling the amounts and types of minor constituents incorporated into the polymer chain to impart such properties as hardness, adhesivity, malleability and the like. While the effects of the addition of minor amounts of various monomers to a polymer chain are known in a general way, the state of the art is not such at this point where certainty prevails and extensive experimentation is usually required to improve specific properties of a polymer.

The present invention is based on the finding that a specific thermoplastic butadiene-styrene type polymer can be very beneficially modified by incorporating minor amounts of a nitrile and an alpha-beta-unsaturated organic acid type monomer into the polymer chain. The resulting multipolymer in latex form is capable of being swollen and when used as a mineral pigment binder in a paper coating composition has several unique properties, as follows:

(1) It acts to disperse the pigment; thus relatively low viscosity, high solids mixtures can be prepared.

(2) Because of the swellable nature of the polymer, the viscosity of a high solids mixture is easily controlled by adjusting pH.

(3) The swollen polymer has good water holding properties. While its water holding ability is not as much as proteinaceous materials such as casein, it is superior to the synthetic latices whose use is limited to certain base paper and coating methods. Its water retention is superior to that of a conventional butadiene-styrene (Dow 512-R) type coating.

(4) The polymer has an affinity for cellulosic fibers and seems to "strike into" the web to a much greater degree than other types of latices.

(5) While the coating has good flexibility this does not result in limpness in the coated sheet as is the case with other synthetic latices. The adhesive of this invention has many of the properties of conventional synthetic latices but it does produce a considerably stiffer paper. The Instron Stiffness of the sheet is greater than that given by a conventional 60/40 butadiene-styrene latex paper coating composition applied to the same sheet in an equivalent composition.

(6) Since this polymer is thermoplastic, it finishes to a very high gloss when super-calendered. The gloss is much better than that of a conventional casein-type of coating. This is without the wrinkling and cutting that occurs with a limp sheet.

(7) The coating is very adherent. Because the polymer in final form is basically a water resistant material, the wet rub and wet pick resistance of the coating are excellent, much better than those given by common adhesives, and this is not at the expense of limpness.

(8) The ink receptivity and gloss ink holdout are superior. In addition, the print rating is high because of the flatness of surface afforded by the coating.

(9) The curl resistance of a sheet coated on a single side is exceptional. This is considered to be a distinctive property.

(10) The coating has a very desirable velvety "hand" or feel.

The latex of the polymeric adhesive is useable as produced and cooking or other treatments are not required to prepare it. The gloss, opacity, and brightness of the finished paper are not adversely affected by the amount of the adhesive used, as is the case with many other latices. With most adhesives, gloss decreases as the amount of adhesive in the coating composition increases. The coating composition of this invention does not show this effect. The amount of the polymer adhesive can be varied over a wide range without appreciably affecting the gloss rating of the coating. In total, the coating composition of this invention results in a vastly improved printing sheet having excellent fidelity.

A high quality coated paper needs to have several attributes. With a particular type coating machine, e.g., trailing blade or air knife, and a given pigment, e.g., calcium carbonate, or titanium dioxide, the quality of the coating is almost entirely dependent upon the adhesive. There are some 15 to 20 different attributes or properties which contribute, in an important manner, to a really good coated paper. About half of these properties are of prime importance and are individually significant. The remainder, although not independently significant unless one of them falls below the established minimum, are as a group highly significant.

The major properties are pigment binding strength, calendered gloss, opacity, brightness, wet pick strength, wet rub, stiffness, ink setting time, and water retention. The less important properties are viscosity, solids coated, porosity, dusting, odor, varnish gloss, and fading.

The most important single property of the adhesive is pigment binding strength. This property measures the strength of the bond between the paper and the coating materials which in turn is the prime determinate of the over-all quality of the paper. This property is measured by a machine designated as the IGT printability tester. This machine, as well as the test for determining pigment binding strength, has been described in the February 1956 issue of the American Pressman. Another machine used to determine this property of pigment binding strength is the MP print tester and the results obtained on this machine can be correlated to the results obtained using the IGT tester. The pigment binding strength is determined by finding, using a specified ink, the highest printing speed which may be used before picking starts. The higher the speed the more desirable the adhesive.

The calendered gloss is an important property, the higher the gloss, the more desirable the adhesive. The standard test for determining this property is TAPPI Std. T480m–51. With respect to this property, as well as the pigment binding strength, the standard of comparison is casein. Any new material should be better than casein.

Opacity, which is measured by TAPPI Std. T425m–60 should be as high as possible. Brightness is also an important property and the higher it is the more desirable the adhesive. It is determined by TAPPI Std. T452m–58. The standard of comparison for both opacity and brightness is a 60/40 styrene-butadiene latex.

Wet pick is another important property and for most applications any value of four and one-half or less is acceptable. This property is important because it determines whether the latex may be used in the modern high speed printing presses. The test used is substantially the same as the "piling propensity" test described by Oehme and Nepper in TAPPI, vol. 43, No. 10 (October 1960), pp. 174A–176A.

In addition to these required and established properties which are necessary for the production of a high quality paper, the use of the hydrophilic latex of the invention imparts a quality not heretofore available in any paper; namely, that of dimensional stability, or as it may be termed, flatness. By this is meant that the paper will not tend to curl on storage during changes in humidity and temperature. This is a most valuable property in that it not only permits the carrying of a larger inventory than would otherwise be possible, but in addition, allows shipment from, for example, a paper mill in Maine to a printing plant in New Orleans during the middle of the winter without fear that the paper will curl or otherwise change shape because of the effect of climatic conditions. This property is determined by measuring the lift of the edge of a circle of the coated paper two inches in diameter at a relative humidity of 65%.

In brief compass, this invention is an improved paper coating composition comprising an alkaline aqueous slurry of paper-coating-grade-mineral pigment and a dispersed hydrophilic polymeric adhesive. The adhesive is a thermoplastic hydrophilic flexible multipolymer prepared by the emulsion polymerization of a diolefin equivalent (butadiene), a vinyl aromatic equivalent (styrene), a vinyl cyanide (acrylonitrile), and an acrylic acid type monomer (methacrylic acid). This polymer may be considered to be composed of basic building blocks or units consisting of a monomer imparting elastic properties, the butadiene, and a monomer that contributes to hardness and thermoplasticity, the styrene. This basic unit has interposed throughout monomer units containing hydrophilic groups.

It would be expected that the carboxylating of the basic butadiene-styrene polymer via the carboxyl groups would effect the hydrophilic properties of the polymer and improve its water holding performance and affinity for the cellulosic fibers. The nitrile would be expected to improve its swellability in polar solutions and in conjunction with the acid groups its dispersive properties. Incorporation of these two monomers should also increase hardness and stiffness. It is surprising that these gains in desirable properties are not at the expense of other properties as is usually the case, e.g., hardness vs. flexibility and pick resistance, flexibility and fold resistance vs. limpness, water insensitivity vs. adherence to fiber, etc. No reason is known why this particular adhesive should yield a coating with a velvety hand. It is believed, however, that the nitrile in the proportions used favorably controls the uniform placement and spacing of the acrylic acid group along the polymer chain and that this accounts for the over-all improved performance of the adhesive.

This controlling or moderating effect of the nitrile is believed to be due to the effect the nitrile has on the polymerization rates of the other monomers, but the manner in which it exerts this beneficial effect is not clear.

By "diolefin equivalent" is meant a monomer having the characteristic 1,3-unsaturated of 1,3-butadiene:

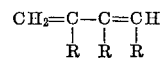

wherein R is a hydrogen or a methyl group. Piperylene, isoprene and hexadiene-1,3 are examples. Other members of this recognized class of monomers that impart elastic properties are chloroprene and chloropentadiene.

By a "vinyl aromatic" is meant a monomer having a single vinyl group directly attached to an aromatic (benzene) nucleus, such as vinyltoluene and para-ethylstyrene. The aromatic nucleus can have one to three alkyl groups attached thereto having a size in the range of 1 to 2 carbon atoms each. Other hardness imparting monomers equivalent to styrene that can be used alone or in combination are para-chlorostyrene and 2,4-dichlorostyrene, and methacrylate esters such as methyl methacrylate, ethyl methacrylate, and 2 ethyl hexyl methacrylate. By a "nitrile" is meant a polymerizable monomer having the following formula:

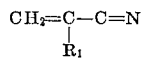

wherein $R_1$ is a hydrogen or an alkyl group of 1 to 4 carbon atoms. Methacrylonitrile and alpha-butylacrylonitrile are examples. By "acrylic acid type monomer" is meant a polymerizable alpha-beta-unsaturated acid such as methacrylic acid having the following formula:

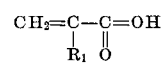

Examples of other related alpha-beta-unsaturated acids are alpha-chloroacrylic acid, itaconic acid, fumaric acid, maleic acid, citraconic acid, and tetraconic acid.

The ratio of the monomers is given in the Table I presented hereinafter. If less than the minimum amount of butadiene is used, the resulting polymer when used as an adhesive for paper coating will not have the desired and required strength characteristics. If the critical amount is exceeded the polymer reaches a state of instability and tends to discolor to an extent such that it is not acceptable for high quality printing paper.

If the minimum amount of acid is not used the resulting polymer will not, when used as a paper adhesive, give a paper with the stiffness required for use in modern high speed printing equipment. In the event that over about 20 parts is used, the over-all balance of properties of the resulting polymer may be less than the minimum tolerable for the particular application.

The amount of vinyl compound, once this is sufficient for the minimum stiffness qualities of the final polymer, is dependent upon the amounts of the various other components.

The nitrile compound should not exceed more than about 15 weight percent of the polymer. If this value is exceeded there is no increase in the effectiveness of the distribution of the acid compound. The best amount for most effective distribution of the acid will vary with the percentages of the other components and within the stated limits the greater the amount of nitrile the better distribution of acid and the less acid required for maximum efficiency of the polymer as a paper coating adhesive. The preferred amount of the nitrile lies in the range of 5 to 12 weight percent.

The multipolymer of this invention is prepared by conventional emulsion polymerization techniques using a polymerization initiator or catalyst of the free radical type; an emulsifying agent for micelle formation, such as water soluble soap derived from fats or oils containing in the range of 10 to 20 carbon atoms (sodium lauryl sulfate); antifoamants such as tributyl phosphates and a polymerization regulator such as the mercaptan (dodecyl mercaptan) or the halogenated organic compounds, (carbontetrachloride). Catalysts that have been used are for example ammonium persulfate, hydrogen peroxide, and 2,2-azo-bis-isobutyronitrile. The reaction temperature can vary between 32° to 190° F. and the reaction time between 1 and 50 hours. Suitable emulsion polymerization systems are described in Vinyl and Related Polymers, C. E. Schildknecht, John Wiley & Sons, 1952.

The coating compositions are prepared from the polymer obtained from the emulsion polymerization by simple mixing with pH being adjusted as desired with any suitable alkali such as sodium hydroxide, ammonia, amino methyl propanol and diethanolamine. The polymer will take up water to the extent of at least 100 weight percent. The polymer is compatible with various other types of conventional adhesives, such as casein. The coating weights used will normally be in the range of 2.5 to 30 pounds (dry solids) per ream per side. The base paper weight will usually be in the range of 30 to 500 pounds per ream.

The following example will serve to make this invention clear. The table presented hereinafter summarizes the specific pertinent conditions applicable to this invention and to the example.

PREFERRED EMBODIMENTS

A 40 weight percent (resin solids) of a multipolymer was prepared by conventional emulsion polymerization.

Three parts of an emulsifier, an alkyl aryl sodium sulfonate, was added to 125 parts water. This solution was then charged to a 250 gallon closed reactor.

A portion of the polymerizable monomers made up of 36 parts of styrene, 10 parts of acrylonitrile, 14 parts of glacial methacrylic acid, and 1.8 parts of octyl mercaptan, a regulator, was added to the reactor which was then flushed with nitrogen. Thereafter the other monomer, 38 parts of butadiene, was added with agitation and the mass heated until a temperature of 122° F. was reached. At this temperature, a previously prepared catalyst solution of 0.3 part of potassium persulfate in 10 parts of deionized water was added to the reactor. Polymerization was conducted with stirring until the solids level of the reactor reached 25% of the charge at which time additional catalyst solution, 0.2 part of potassium persulfate in 15.0 parts of deionized water, was added. One hour after this catalyst addition, the reaction temperature was raised to 158° F. where it continued until the total solids content was about 40%. The polymer was transferred to a stripper and stripped until the residual monomer content was less than 0.15%. The polymer was then cooled to room temperature and stabilized by the addition of ammonia as a stabilizer.

The polymer so obtained was diluted with water to give a 25 weight percent solids and 0.25 part (per dry solids) tributyl phosphate was added as a defoamer. The pH was adjusted with strong ammonium water (about 5 percent on dry solids) to 8.5.

The alkaline polymer so prepared was then used to formulate three different types of coating compositions, designated as I, II, and III from which coated papers were prepared on standard mill production equipment and evaluated.

COMPOSITION I

This was a high solids content offset enamel applied by trailing blades on the paper machine. About 64 parts (wet weight) of the alkaline polymer was mixed with 80 parts of coating clay, 20 parts of precipitated calcium carbonate, 0.5 part of tetrasodium pyrophosphate, and 1 part of vegetal (a defoamer). Initially only about ⅔ of the alakline polymer was added to the other ingredients in a Sigma Blade Mixer to form a mixture containing about 76 weight percent solids. This was mixed for about ½ hour until a breakdown in viscosity occurred. The remainder of the alkaline polymer was then added along with water to bring the solids to 63.5 percent. The coating was screened and was then ready for use. Its Brookfield viscosity was about 350 cps. at 100 r.p.m. and the electrical water retention was 23 seconds.

The paper web was formed on a Fourdrinier machine from a mixture of bleached hard and soft wood fibers having both long and short fibers. The furnish contained a clay filler but no size. The paper was prime coated with a conventional clay-starch coating, 2.5 pounds per side, and had a finished weight of 50 pounds per ream.

The coating of this invention was applied at the paper machine by trailing blades. The prime coat had been applied and dried just previous to the blade coating operation. The paper was coated on both sides using two trailing blades in tandem. About 5 pounds was applied to each side. The machine ran at a speed of about 600 feet per minute. The paper was finished by supercalendering. The adhesive was more thermoplastic than the conventional proteinaceous or starch adhesives and finished to a gloss of 63.5, which is low because of the light weight of the coating. The sheet was not limp, as is the case with some other types of polymers, and could be calendered quite easily without wrinkling and cutting. The Instron Stiffness, bending parallel to the grain was 4.97 and was 7.90, bending at right angles to the grain.

It was noted that the coating composition had an affinity for the cellulose fibers and penetrated well into web. This is shown and measured by the resistance to fiber picking when the paper is printed. The coating of this invention gives a much stronger coating. The MP pick resistance as determined by the MP Tester was E++ (very strong), and the wet rub resistance as determined by rubbing with a wet finger was excellent, showing that it had good water resistance. The ink setting time as determined by Warren Wedge Transfer method was 400–600 seconds. The opacity of the calendered sheet was 92.7 (average), and the brightness of the wire side was 78.5 (average).

COMPOSITION II

This was a low solids off machine offset enamel for use on a roll coater. Seventy-two parts wet weight of the alkaline polymer was mixed with 75 parts fine coating clay, 15 parts fine calcium carbonate, 10 parts titanium dioxide, 1 part tetrasodium pyrophosphate, 1 part vegetal, and enough water to adjust to 42 percent coating solids. This mixture was mixed at high speeds for 20 minutes in a tank with turbo type agitator, strained through a 100 mesh screen and then was ready for use. Its Brookfield viscosity was 112 cps. at 100 r.p.m. and its electrical water retention was 3 seconds. If a conventional butadiene-styrene adhesive (Dow 512–R) were substituted in the above coating for the polymer of this invention, the water retention of the coating would be 2 seconds.

A 60 pound ream weight prime coated unsized body stock was coated with Composition B. The furnish for the body stock was the same as used for Composition I. The prime coating consisted of a conventional starch-clay mixture applied in the amount of about 4 pounds on each side. Composition II was applied by a roll coater running at about 300 feet per minute. Ten pounds was applied on each side for a total of 20 pounds. The coated paper was run through a supercalender stack and was then suitable for offset, letter press or gravure printing.

The gloss of the sheet was 74.0. Its Instron Stiffness bending parallel to the grain was 6.40, and was 14.05 bending at right angles to the grain.

As previously noted, the water swellable polymer gives lower coating viscosities. Thus higher solids compositions can be realized than would normally be the case. At high solids contents, less water has to be removed and it is possible therefore to run faster with a given amount of heat or drying capacity. Although additional ammonia may be used to increase viscosity for improved flow properties, this means of viscosity control is not as effective at low solids contents and is more usefully applied to the machine type coatings which have high solids contents.

COMPOSITION III

About 62 parts (wet weight) of the alkaline polymer was mixed with 95 parts fine coating clay, 5 parts titanium dioxide, 1 part tetrasodium pyrophosphate, 2.5 parts ammonia cut casein, 1 part vegetal, and water for 43 percent solids. The coating was mixed in a tank with turbo type agitator at high speed for twenty minutes and strained through a 100 mesh screen. The Brookfield viscosity was 91 cps. at 100 r.p.m. and the electrical water retention was 13.5 seconds. If a butadiene-styrene adhesive (Dow 512-R) were substituted in the formula for the present polymer, the water retention of the coating would be 1 second.

Approximately 12 pounds (dry weight) of Composition III was applied by the use of an air knife to the prime coated wire side of a label type body stock. The finished weight was 63 pounds per ream. The coater ran at a speed of 700-800 feet per minute. The coated paper was run through a supercalender and then was suitable for offset, letter press, or gravure printing. The body stock used was prepared from a mixture of bleached hard and soft wood fibers, both long and short, containing clay and a moderate amount of resin size. The prime coating was conventional starch clay applied to the wire side only in the amount of about 5 pounds per ream.

The gloss of the coating was 70.8. The Instron Stiffness of the sheet with the grain was 5.13, and at right angles to the grain was 8.87. The gloss of a comparable conventional casein/butadiene-styrene coating is 56.0.

This was a one side coated paper and it has the unusual ability to remain dimensionally stable under extremes of relative humidity. In other words, the paper did not curl to either side. It remained flat even though the relative humidity was varied over the range of 10 to 90 percent. No other adhesive is known that has this property.

The use of casein as in Composition III is considered to be desirable when the coating is to be forced dried with circulating air especially at an elevated temperature. The use of small amounts of casein or similar proteinaceous adhesives is a much preferred embodiment of this invention. The casein helps to prevent the multipolymer in the coating from migrating to the surface of the sheet when it is forced dried. If the multipolymer does migrate, the ink setting time increases and the paper may not print satisfactorily. Also, there would be a loss of strength since not enough adhesives would drain into the base sheet. There are indications that the casein may reduce the curl of a varnished sheet when it is oven dried. Also, the casein reduces the tendency of the sheet to stick on a supercalender stack.

The amount of casein used in this embodiment of the invention should, if possible, be held to a minimum since it tends to lower the gloss. Preferably the casein type adhesive amounts to 3 to 30 weight percent on the multipolymer adhesive. By a casein-type adhesive is meant the conventional alkaline solubilized proteinaceous adhesives such as soy protein, zein, and casein (all types).

Table II gives the compositions of a series of compositions that were tested in order to evaluate the effect of varying the monomeric constituents of the polymer of this invention. Table III gives the results that were obtained. The tables illustrate the essentiality of having the proper balance between the proportions of the four monomers in order to achieve a coating composition having an overall balance of properties superior to that of conventional compositions.

The test paper was a 53 pound per ream (3,300 sq. ft.) unsized impregnated type of body stock normally used for book paper. The coatings were applied to both sides of the sheet in an amount of 10 pounds per ream, ±0.2 pound, per side by a laboratory air knife coater.

Coatings A and B were comparative coatings, the former being an all 60/40 butadiene-styrene (Dow 512-R) coating and the latter an all casein coating.

It is interesting to note from the examples that the constituents of the basic building unit, butadiene (B) and styrene (S), are present in the mole ratio of roughly 2/1 (BSB). The acrylic acid (A) imparting the hydrophilic properties and the nitrile (N) that controls its placement are present in a mole ratio of about 1/1. The number of moles of the basic unit, BSB, is about equal to the number of moles of the functionality imparting monomers, i.e., $BSB/(A+N) \cong 1$, such that one functional group is available for each basic unit. The reasons for these relationships cannot be explained, but it is known that these ratios are quite important to the performance of the adhesive.

By a "high solids composition" is meant a coating composition having a dry solids content (resin plus clay) in the range of 50 to 75 weight percent, usually 58 to 64 weight percent.

By "ream" is meant 500 sheets, 25 x 38 inches.

By "hydrophilic" is meant a polymeric material which will take up, or which tends to dissolve in water because it contains, as a part of the polymer molecule, functional groups, e.g., carboxyl or hydroxyl, which causes this phenomenon.

TABLE I.—PERTINENT VARIABLES

| Emulsion Polymerization Recipe | Range | Example |
|---|---|---|
| Weight Percents: | | |
| Diolefin equivalent | 34 to 46 | 38 (B). |
| Vinyl Aromatic | 19 to 54 | 36 (S). |
| Vinyl Cyanide | 1 to 15 | 10 (N). |
| Acrylic acid type monomer | 10 to 18 | 14 (A). |
| Mercaptan | 0.5 to 4 | 1.8 (Tert. octyl mercaptan). |
| Free radical catalyst, parts | 0.3 to 1.0 | 0.5 (Potassium persulfate). |
| Emulsifier, parts | 2 to 4 | 1 (Siponate D S-10). |
| pH | 2 to 7 | |
| Reaction Temperature, °F | 32 to 190 | 122-158. |
| Percent monomer reacted | >90 | 98. |
| Finished Latex: | | |
| Total resin solids, weight percent | 30 to 50 | 40.8. |
| Average particle size, Angstroms | 400 to 2,500 | 1,000. |
| Coating Slurry: | | |
| Total solids, wt. percent | 10 to 75 | 63.5. |
| Mineral pigment/resin, weight ratio | 20/1 to 2/1 | |
| pH | 6 to 12 | 8.5. |
| Viscosity, cps. at 100 r.p.m., and 75° F. | 10 to 40,000 | 350. |

B=Butadiene; S=Styrene; A=Methacrylic acid; N=Acrylonitrile.

TABLE II

| Coating Number | Weight Percents | | | | Pigment | Adhesive |
| | Butadiene | Styrene | Acrylonitrile | Methacrylic acid | | |
|---|---|---|---|---|---|---|
| 2 | 38 | 36 | 10 | 14 | Clay | Polymer 17 parts per 100 pigment. |
| 3 | 38 | 36 | 10 | 14 | 90% clay, 10% TiO₂ | Polymer 18 parts per 100 pigment. |
| 4 | 38 | 30 | 10 | 20 | 100% clay | Polymer 15 parts per 100 pigment. |
| 5 | 38 | 32 | 10 | 20 | ----do---- | Polymer 17 parts per 100 pigment. |
| 6 | 38 | 32 | 10 | 20 | ----do---- | Do. |
| 7 | 38 | 29 | 10 | 17 | ----do---- | Do. |
| 8 | 38 | 32 | 10 | 14 | ----do---- | Do. |
| 9 | 44 | 20 | 10 | 20 | ----do---- | Do. |
| 10 | 51 | 18 | 8 | 16 | ----do---- | Polymer 15 parts per 100 pigment. |
| A | | | | | ----do---- | Do. |
| B | | | | | ----do---- | Casein 15 parts per 100 pigment. |

TABLE III

| Coating Number | 2 | 3 | 4 | 5 | 6 | 7 | 8 | 9 | 10 | A | B |
|---|---|---|---|---|---|---|---|---|---|---|---|
| Polymer Constituents: | | | | | | | | | | | |
| Moles: | | | | | | | | | | | |
| B | .713 | .713 | .713 | .713 | .713 | .713 | .713 | .825 | .945 | | |
| S | .346 | .346 | .289 | .308 | .308 | .279 | .308 | .192 | .173 | | |
| N | .189 | .189 | .189 | .189 | .189 | .189 | .189 | .189 | .151 | | |
| A | .163 | .163 | .233 | .233 | .233 | .198 | .163 | .233 | .186 | | |
| Mole Ratios: | | | | | | | | | | | |
| B/S | 2.06 | 2.06 | 2.47 | 2.31 | 2.25 | 2.55 | 2.31 | 4.3 | 5.47 | | |
| A/N | .863 | .863 | 1.23 | 1.23 | 1.23 | 1.05 | .863 | 1.23 | .813 | | |
| BSB/A+N | 3.53 | 3.53 | 2.32 | 2.42 | 2.44 | 2.56 | 3.45 | 4.15 | 3.13 | | |
| Slurry Inspections: | | | | | | | | | | | |
| Solids Cont. for Meas., percent | 47.5 | 43.8 | 47.5 | 47.5 | 47.5 | 47.5 | 47.5 | 47.5 | 47.5 | 47.5 | 34 |
| Visc., cps., 100 r.p.m | 52.0 | 70.0 | 72.0 | 80.0 | 112.0 | 56.0 | 48.0 | 66.0 | 70.0 | 57 | 186 |
| Elec. Water Retention | 8.5 | 15.2 | 7.4 | 16.9 | 7.2 | 4.8 | 12.7 | 8.5 | 8.0 | 1 | 21 |
| Solids Cont. as Coated, percent | 47.5 | 43.8 | 47.5 | 47.5 | 44.0 | 47.5 | 47.5 | 47.5 | 47.5 | 44 | 34 |
| Coated Paper Inspections: | | | | | | | | | | | |
| B & L Gloss (Calendered wire) | 70.3 | 66.0 | 65.5 | 65.6 | 66.0 | 71.7 | 72.2 | 76.9 | 79.4 | 76.2 | 63.2 |
| Allegany Brightness (Wire) | 78.6 | 72.1 | 79.2 | 79.0 | 78.5 | 79.2 | 78.8 | 78.5 | 78.9 | 78.6 | 80.8 |
| M.P. Test | E+++ | *mst E | E— | E++ | E++ | O+++ | E+ | *mst E+++ | E+ | *mst E+++ | E |
| Wet Rub/Wet Pick | 3.5 | 2.0 | 3.5 | 3.0 | 3.5 | 4.5 | 3.5 | 5.0 | B+ | G | G— |
| Ink Setting (Time, secs.) | 80 | 109 | 133 | 166 | 118 | 118 | 127 | 80 | 78 | 118 | 198 |
| Instron Stiffness: | | | | | | | | | | | |
| (With Grain)×10⁻³ | 4.784 | 6.55 | 5.683 | 5.671 | 6.116 | 5.556 | 4.462 | 4.62 | | | |
| (Perpendicular to Grain)×10⁻³ | 9.75 | 10.45 | 10.56 | 11.23 | 10.47 | 10.80 | 9.07 | 9.80 | 8.04 | 7.50 | 9.67 |
| Fade Rating (Percent, 48 hrs.) | 0.5 | | 3.0 | 3.5 | 3.5 | 2.5 | 4.0 | 4.0 | 4.0 | 3.0 | 0 |

*mst = much stronger than.

What is claimed is:

1. An improved paper coating composition comprising an alkaline aqueous slurry of a paper-coating-grade mineral pigment and a dispersed hydrophilic elastomeric adhesive, said adhesive being a thermoplastic polymer prepared by emulsion polymerization of 34 to 46 weight percent of a butadiene equivalent, 19 to 54 weight percent of a vinyl aromatic hydrocarbon, 1 to 15 weight percent of an acrylic nitrile and 10 to 18 weight percent of an alpha beta-unsaturated acid, said composition having an electrical water retention time of from 3 to 21 seconds and when applied to a paper sheet producing an Instron stiffness greater than that given by a 60–40 styrene-butadiene latex and a gloss higher than that given by a casein adhesive, both as applied to the same paper sheet in equivalent coating compositions and weights.

2. The composition of claim 1 wherein said butadiene equivalent has the formula:

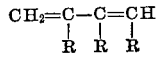

wherein said acrylic nitrile has the formula:

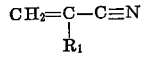

wherein said alpha beta-unsaturated acid has the formula:

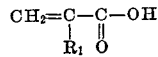

wherein R is a hydrogen or a methyl group and $R_1$ is a hydrogen or an alkyl group having in the range of 1 to 4 carbon atoms, and wherein said vinyl aromatic hydrocarbon has a single vinyl group directly attached to a benzene nucleus.

3. An improved coated paper comprising a paper web coated with the composition of claim 1.

4. An improved paper coating composition comprising an aqueous slurry having a pH in the range of 6 to 12 of a paper-coating-grade mineral pigment and a dispersed polymeric adhesive, the weight ratio of mineral pigment to polymeric adhesive being in the range of 20/1 to 2/1 and the total solids content of said aqueous slurry being in the range of 10 to 75 weight percent, said polymeric adhesive being a hydrophilic thermoplastic multipolymer prepared by emulsion polymerization and having an average particle size in the range of 400 to 2500 angstroms, said multipolymer consisting essentially of a polymer of 34 to 46 parts butadiene, 19 to 54 parts styrene, 1 to 15 parts acrylonitrile, and 10 to 18 parts methacrylic acid, said parts being on the basis of 100 parts of finished polymer, said composition having an electrical water retention time of from 3 to 21 seconds and when applied to a paper sheet producing an Instron stiffness greater than that given by a 60–40 styrene-butadiene latex and a gloss higher than that given by a casein adhesive, both as applied to the same paper sheet in equivalent coating compositions and weights.

5. The composition of claim 4 comprising in addition in the range of 3 to 30 weight percent on said polymeric adhesive of a casein adhesive.

6. An improved gloss paper comprising a prime coated paper web coated on the prime coated side thereof with the evaporation residue of the composition of claim 4.

7. An improved adhesive composition comprising a water dispersion of a hydrophilic elastomeric resin having an average particle size in the range of 400 to 2500 angstroms, said resin being a thermoplastic multipolymer prepared by emulsion polymerization of 34 to 46 parts of a butadiene equivalent, 19 to 54 parts of a vinyl aromatic hydrocarbon, 1 to 15 parts of an acrylic nitrile and 10 to 18 parts of an acrylic acid monomer, said parts being on the basis of 100 parts of said multipolymer, said composition having an electrical water retention time of from 3 to 21 seconds and when applied to a paper sheet producing an Instron stiffness greater than that given a 60–40 styrene-butadiene latex, and a gloss higher than that given by a casein adhesive, both as applied to the same paper sheet in equivalent coating compositions and weight.

8. The adhesive composition of claim 7 wherein said resin consists of butadiene, styrene, acrylonitrile and methacrylic acid, the mole ratio of butadiene to styrene being about 2, the mole ratio of methacrylic acid to acrylonitrile being about 1 and the mole ratio of the number of units composed of two butadiene molecules and one styrene molecule to the sum of the moles of acrylonitrile and methacrylic acid being about 1.

References Cited

UNITED STATES PATENTS 2,395,017  2/1946  Semon _____ 260—80.7
2,537,114  1/1951  Young et al. _____ 260—8
2,759,910  8/1956  Milne et al. _____ 260—80.5

WILLIAM H. SHORT, *Primary Examiner.*

E. M. WOODBERRY, *Assistant Examiner.*